United States Patent
Ooshima et al.

(10) Patent No.: US 10,907,730 B2
(45) Date of Patent: Feb. 2, 2021

(54) VEHICLE CONTROL DEVICE (71) Applicant: ISUZU MOTORS LIMITED, Tokyo (JP)

(72) Inventors: Tatsuya Ooshima, Saitama (JP); Nobuyuki Nishimura, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/613,089

(22) PCT Filed: May 10, 2018

(86) PCT No.: PCT/JP2018/018045
§ 371 (c)(1),
(2) Date: Nov. 12, 2019

(87) PCT Pub. No.: WO2018/207854
PCT Pub. Date: Nov. 15, 2018

(65) Prior Publication Data
US 2020/0200263 A1 Jun. 25, 2020

(30) Foreign Application Priority Data
May 12, 2017 (JP) .................................. 2017-095968

(51) Int. Cl.
*F16H 59/14* (2006.01)
*F16H 59/36* (2006.01)
(Continued)

(52) U.S. Cl.
CPC ............. *F16H 59/66* (2013.01); *F16H 59/36* (2013.01); *F16H 59/68* (2013.01); *F16H 61/68* (2013.01);
(Continued)

(58) Field of Classification Search
CPC .......... F16H 59/14; F16H 59/36; F16H 59/48; F16H 59/66; F16H 59/68; F16H 61/02;
(Continued)

(56) References Cited

U.S. PATENT DOCUMENTS 5,667,458 A * 9/1997 Narita ................... F16H 61/143
477/118
5,832,400 A 11/1998 Takahashi et al.
(Continued)

FOREIGN PATENT DOCUMENTS

| CN | 102395817 A | 3/2012 |
| CN | 104696504 A | 6/2015 |

(Continued)

OTHER PUBLICATIONS

International Search Report and Written Opinion for related International Application No. PCT/JP2018/018045, dated Aug. 14, 2018; English translation of ISR provided (9 pages).
(Continued)

*Primary Examiner* — Tinh Dang
(74) *Attorney, Agent, or Firm* — Procopio, Cory, Hargreaves & Savitch LLP (57) ABSTRACT

A vehicle control device performing upshift to a forward gear stage in a current travel section in a case where: (1) the forward gear stage is higher than a current gear stage; (2) a travel resistance of a vehicle in the current travel section is greater than a driving force in a case of traveling at the forward gear stage; (3) a stall amount until the vehicle passes an end point of the current travel section in a case where the vehicle travels in the current travel section at the forward gear stage is equal to or smaller than a specified value; and (4) a value obtained by subtracting the travel resistance of the vehicle in a forward travel section from a driving force in a case where the vehicle travels in the forward travel
(Continued)

section at the forward gear stage is equal to or greater than a predetermined value.

4 Claims, 8 Drawing Sheets

(51) Int. Cl.
    *F16H 59/48*      (2006.01)
    *F16H 59/66*      (2006.01)
    *F16H 59/68*      (2006.01)
    *F16H 61/02*      (2006.01)
    *F16H 61/16*      (2006.01)
    *F16H 61/68*      (2006.01)
    *B60W 30/188*      (2012.01)

(52) U.S. Cl.
    CPC .. *F16H 2059/366* (2013.01); *F16H 2059/663* (2013.01); *F16H 2059/6815* (2013.01)

(58) Field of Classification Search
    CPC .... F16H 61/16; F16H 61/68; F16H 2059/142; F16H 2059/366; F16H 2059/663; F16H 2059/6815; F16H 2061/166; B60W 30/1884
    See application file for complete search history.

(56) References Cited

U.S. PATENT DOCUMENTS

| | | | |
|---|---|---|---|
| 5,931,886 A | 8/1999 | Moroto et al. | |
| 6,070,118 A | 5/2000 | Ohta et al. | |
| 6,533,704 B2 * | 3/2003 | Saito | F16H 61/20 477/901 |
| 8,463,513 B2 * | 6/2013 | Arai | F16H 61/16 701/55 |
| 9,234,584 B2 * | 1/2016 | Matsuo | F16H 61/68 |
| 2007/0010929 A1 * | 1/2007 | Takeda | B60K 28/16 701/82 |
| 2012/0029776 A1 | 2/2012 | Staudinger et al. | |
| 2013/0345942 A1 | 12/2013 | Staudinger et al. | |
| 2014/0172252 A1 | 6/2014 | Siegel et al. | |
| 2020/0096097 A1 * | 3/2020 | Ooshima | F16H 61/0204 |
| 2020/0096098 A1 * | 3/2020 | Ooshima | F16H 61/16 |
| 2020/0096099 A1 * | 3/2020 | Ooshima | F16H 61/12 |

FOREIGN PATENT DOCUMENTS

| | | |
|---|---|---|
| CN | 104791475 A | 7/2015 |
| CN | 104937315 A | 9/2015 |
| JP | H07158725 A | 6/1995 |
| JP | H08-072591 A | 3/1996 |
| JP | H09-21457 A | 1/1997 |
| JP | H09-303544 A | 11/1997 |
| JP | 2001108194 A | 4/2001 |
| JP | 2001-208194 A | 8/2001 |
| JP | 2014-001823 A | 1/2014 |
| JP | 2014001824 A | 1/2014 |

OTHER PUBLICATIONS

Office Action for related CN App. No. 201880031467.9 dated Jul. 3, 2020. English translation provided; 13 pages.

* cited by examiner

VEHICLE CONTROL DEVICE

CROSS-REFERENCE TO RELATED APPLICATIONS

This application is a U.S. National Stage entry of PCT Application No: PCT/JP2018/018045 filed on May 10, 2018, which claims priority to Japanese Patent Application No. 2017-095968, filed May 12, 2017, the contents of which are incorporated herein by reference.

TECHNICAL FIELD

The present disclosure relates to a vehicle control device for performing upshift of gear stages.

BACKGROUND ART

There has been a technique of setting a shift schedule that minimizes fuel consumption in a travel route based on road information in the travel route from a current position of a vehicle to a target position and a driving force of the vehicle in the travel route (see, for example, Patent Literature 1).

CITATION LIST

Patent Literature

Patent Literature 1: JP-A-H09-21457

SUMMARY OF INVENTION

Technical Problem

In principle, selection of a higher gear stage can reduce fuel consumption of a vehicle, but a relatively low gear stage needs to be selected in order to obtain acceleration in a case where the vehicle travels on an ascending gradient. Therefore, in an automatic transmission of related art, in a case where a gradient varies on a road on which the vehicle is currently traveling, there is a problem that the fuel consumption of the vehicle increases due to selection of the gear stage in consideration of a marginal driving force obtained by subtracting a travel resistance from a maximum driving force of the vehicle.

The present disclosure is made in view of the above circumstances, and an object thereof is to provide a vehicle control device capable of preventing an increase in fuel consumption in a case where a gradient varies on a road on which a vehicle is currently traveling.

Solution to Problem

A vehicle control device according to an aspect of the present disclosure includes: a travel section determination unit configured to determine a forward travel section that is a travel section having a different road gradient from a current travel section in which a vehicle is currently traveling and that is ahead in a travel direction of the vehicle; a forward gear stage selection unit configured to select a forward gear stage, which is a gear stage of the vehicle in the forward travel section based on the road gradient of the forward travel section; and performs upshift to the forward gear stage in the current travel section in a case where: (1) the forward gear stage is higher than a current gear stage, which is a gear stage of the vehicle in the current travel section; (2) a travel resistance of the vehicle in the current travel section is greater than a driving force in a case where the vehicle travels at the forward gear stage; (3) a stall amount until the vehicle passes an end point of the current travel section in a case where the vehicle travels in the current travel section at the forward gear stage is equal to or smaller than a specified value; and (4) a value obtained by subtracting the a resistance of the vehicle in the forward travel section from a driving force in a case where the vehicle travels in the forward travel section at the forward gear stage is equal to or greater than a predetermined value.

The shift control unit may not perform the upshift to the forward gear stage in a case where an estimated value of an engine rotational speed of the vehicle at the end point of the current travel section in the case where the vehicle travels in the current travel section at the forward gear stage is lower than a predetermined rotational speed.

The shift control unit may not perform the upshift to the forward gear stage in a case where a deceleration in a case where the vehicle travels in the current travel section at the forward gear stage is greater than a threshold value.

The shift control unit may not perform the upshift to the forward gear stage in a case where the gradient of the forward travel section is a descending gradient exceeding a reference value.

Advantageous Effects of Invention

According to the present disclosure, it is possible to achieve an effect of preventing an increase in fuel consumption in a case where a gradient varies on a road on which a vehicle is currently traveling.

DESCRIPTION OF EMBODIMENTS

Embodiment

[Outline of Vehicle V According to an Embodiment]

Figure 1:
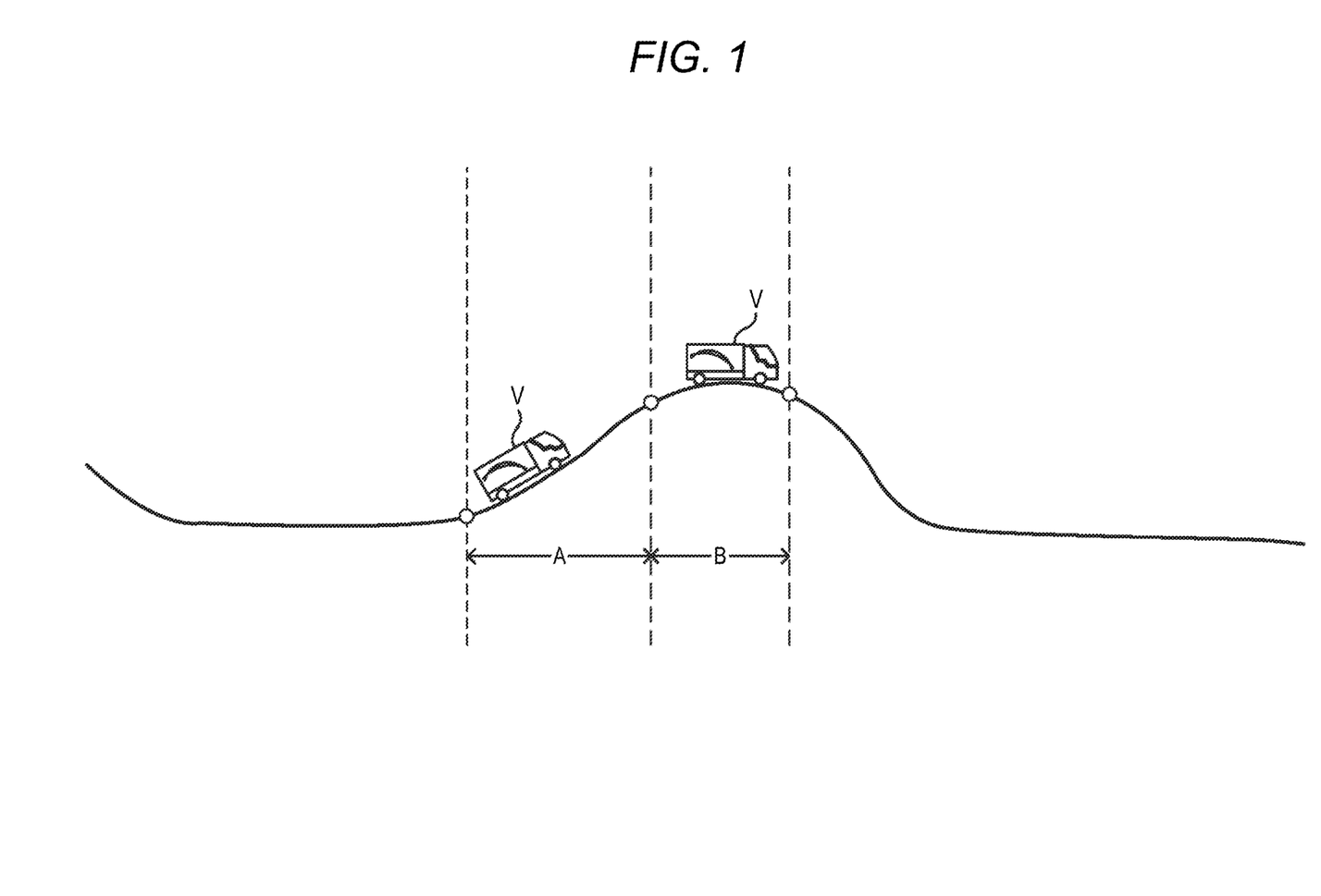
FIG. 1 is a diagram for explaining an outline of a vehicle according to an embodiment.

An outline of a vehicle V according to the present embodiment will be described with reference to FIG. 1. FIG. 1 is a diagram for explaining an outline of the vehicle V on which a vehicle control device 10 of the present embodiment is mounted. The vehicle control device 10 shifts a gear stage of the vehicle V by controlling a transmission.

The vehicle V travels in a continuous section including a current travel section A and a forward travel section B that has a smaller average gradient of a road than the current travel section A. The travel sections are sections in which the gradients of the road can be respectively regarded as equal. The current travel section A is a travel section in which the vehicle V is currently traveling, and the forward travel section B is a travel section adjacent to the current travel section A and ahead of the current travel section A in a travel direction of the vehicle V. The forward travel section B has a different road gradient from that of the current travel section A.

The vehicle control device 10 obtains a driving force generated in the vehicle V after shift of the gear stage in the current travel section A and the forward travel section B, and performs upshift of the gear stage in the current travel section A in advance before reaching a start point of the forward travel section B in a case where the determined driving force satisfies a condition described later. As a result, the vehicle control device 10, for example, advances an upshift timing relative to a case of performing upshift at the start point of the forward travel section, and thus can improve the fuel consumption.

[Vehicle Configuration According to an Embodiment]

Figure 2:
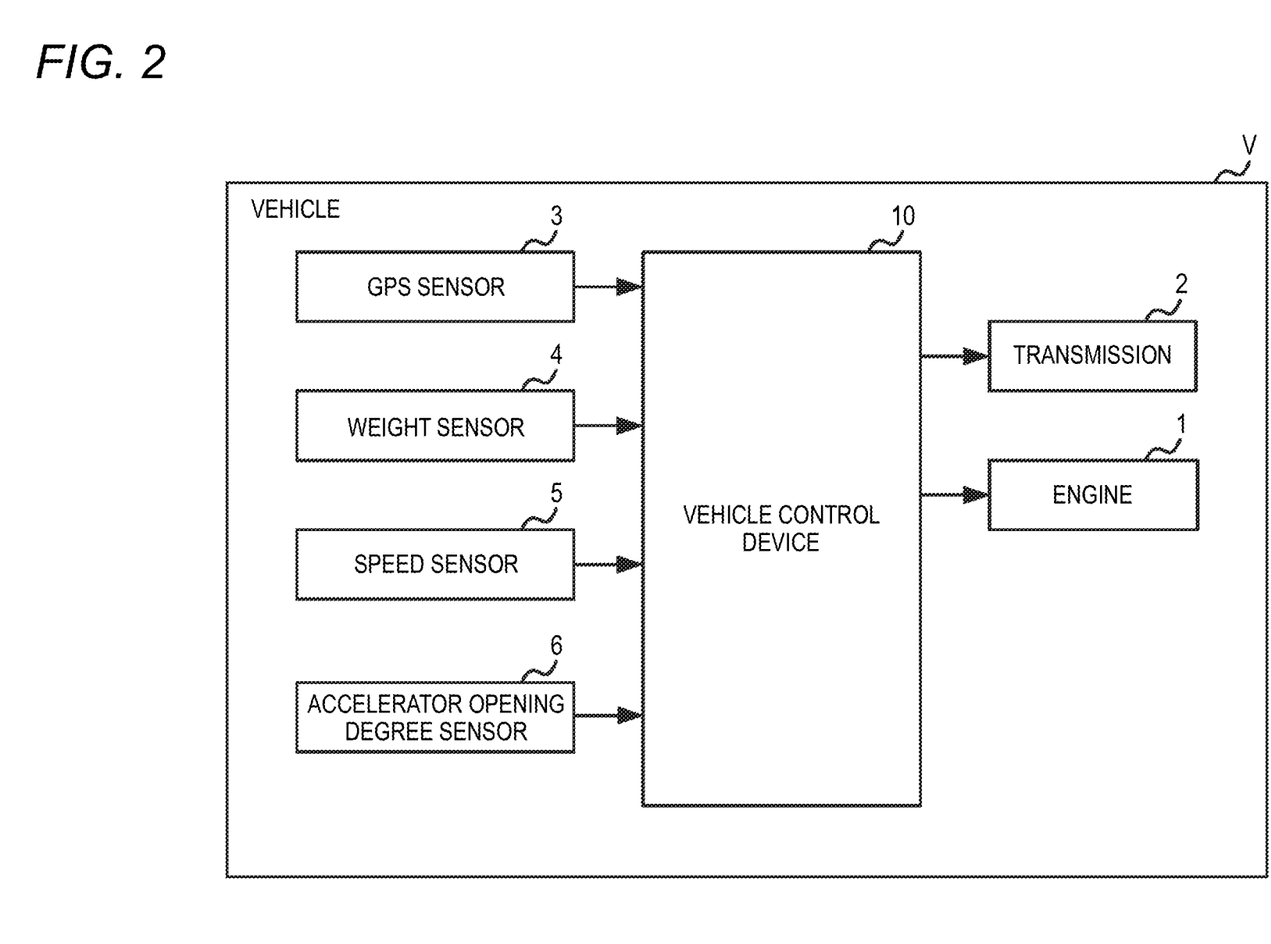
FIG. 2 is a diagram for explaining a configuration of a vehicle according to the embodiment.

A configuration of the vehicle V according to the present embodiment will be described with reference to FIG. 2. FIG. 2 is a diagram schematically showing the configuration of the vehicle V according to the present embodiment. The vehicle V according to the present embodiment includes an engine 1, a transmission 2, a global positioning system (GPS) sensor 3, a weight sensor 4, a speed sensor 5, an accelerator opening degree sensor 6, and the vehicle control device 10.

The vehicle V is a large vehicle that uses the engine 1 such as a diesel engine as a driving force, and is, in particular, a vehicle that is mounted with an automatic travel mode. The transmission 2 transmits the driving force of the engine 1 to a drive wheel (not shown) of the vehicle V. The transmission 2 includes a plurality of stages of gears for converting the driving force of the engine 1.

Here, the "automatic travel mode" in the vehicle V refers to a mode in which the engine 1, the transmission 2, and the like automatically perform constant-speed traveling with the vehicle control device 10 so as to maintain the speed of the vehicle V set in advance even if the driver does not operate an accelerator or a shift lever. The automatic travel mode is mainly assumed to be used when the vehicle V travels on a highway. On the other hand, an "operational travel mode" in the vehicle V is a mode different from the automatic travel mode, and is a mode in which the vehicle V travels upon accelerator operation of the driver.

The GPS sensor 3 receives and analyzes radio waves transmitted from a plurality of navigation satellites so as to acquire a position of the GPS sensor 3, that is, a position of the vehicle V on which the GPS sensor 3 is mounted. The GPS sensor 3 outputs information indicating the position of the vehicle V to the vehicle control device 10.

The weight sensor 4 acquires a total weight of the vehicle V. Specifically, the weight sensor 4 measures a weight of load on the vehicle V, and sums the weight with a weight of the vehicle V alone excluding the load so as to acquire the total weight of the vehicle V. The weight sensor 4 outputs information indicating the total weight of the vehicle V to the vehicle control device 10.

The speed sensor 5 measures the speed of the vehicle V. The speed sensor 5 outputs information indicating the measured speed of the vehicle V to the vehicle control device 10. The accelerator opening degree sensor 6 measures an accelerator opening degree which is a depression amount of an accelerator pedal by the driver of the vehicle V. The accelerator opening degree sensor 6 outputs information indicating the accelerator opening degree to the vehicle control device 10.

The vehicle control device 10 acquires the information from the sensors described above, and controls an amount of fuel to be supplied to a cylinder in the engine 1 and the gear stage of the transmission 2 based on the acquired information. In a case where the vehicle V is in the automatic travel mode, the vehicle control device 10 controls the engine 1 and the transmission 2 so as to travel while maintaining the speed set in the vehicle V. In a case where a speed limit device (SLD) of the vehicle V is operating, the vehicle control device 10 controls the engine 1 and the transmission 2 so that the speed of the vehicle V does not exceed a set upper limit speed.

[Configuration of Vehicle Control Device]

Figure 3:
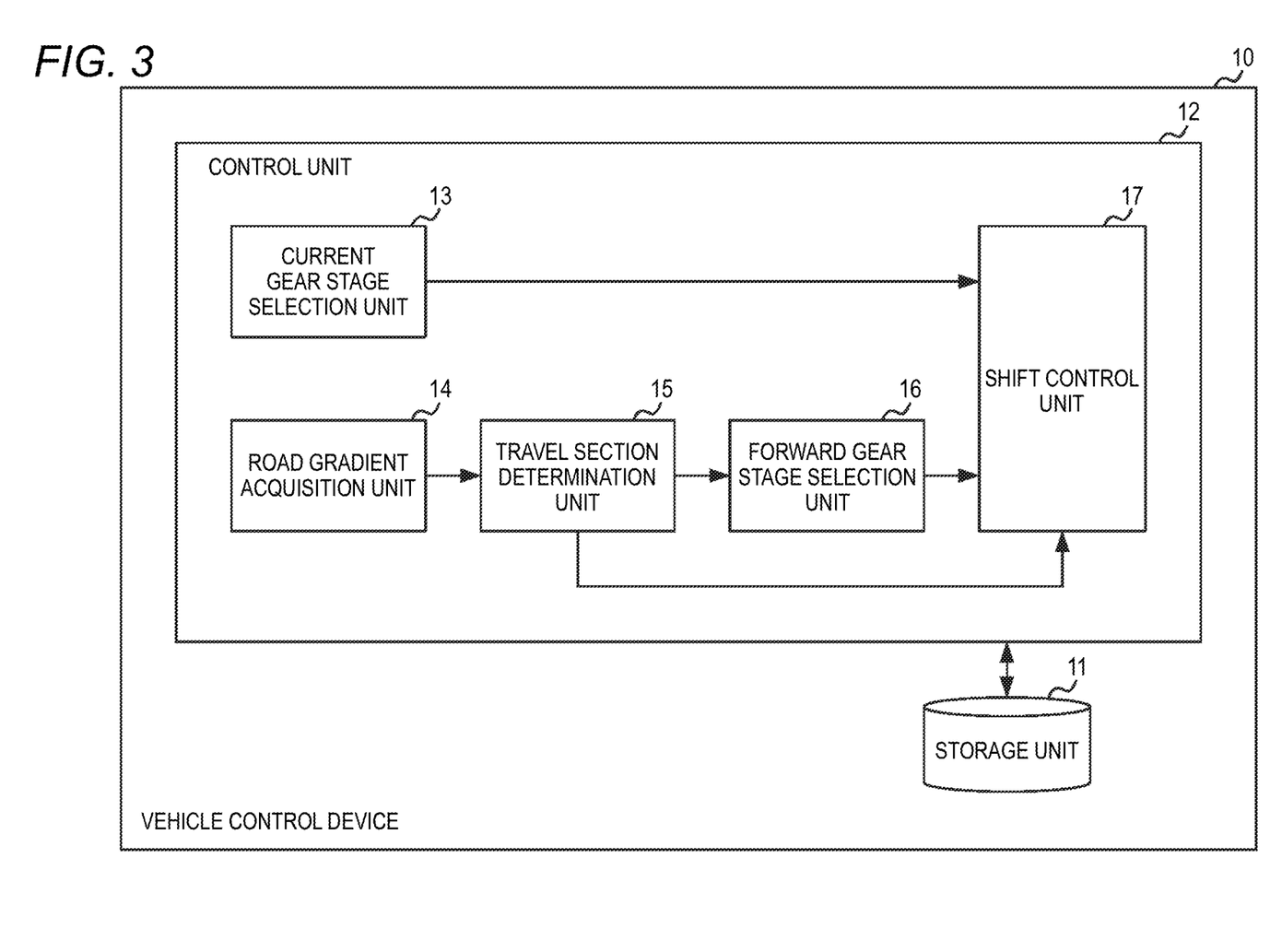
FIG. 3 is a diagram illustrating a configuration of a vehicle control device according to the embodiment.

FIG. 3 is a diagram illustrating the configuration of the vehicle control device 10 according to the present embodiment. The vehicle control device 10 according to the present embodiment includes a storage unit 11 and a control unit 12.

The storage unit 11 is, for example, a read only memory (ROM) or a random access memory (RAM). The storage unit 11 stores various programs for causing the control unit 12 to function.

The control unit 12 is a calculation resource including a processor such as a central processing unit (CPU) (not shown). The control unit 12 implements functions of a current gear stage selection unit 13, a road gradient acquisition unit 14, a travel section determination unit 15, a forward gear stage selection unit 16, and a shift control unit 17 by executing programs stored in the storage unit 11.

The current gear stage selection unit 13 selects a current gear stage, which is a gear stage of the transmission 2 in the current travel section, based on a travel resistance in the current travel section A of the vehicle V. The travel resistance in the current travel section A is a resistance obtained by summing a rolling resistance of tires of the vehicle V, an air resistance applied to the vehicle V, a gradient resistance based on the gradient of the road on which the vehicle V is currently traveling, and the like.

The current gear stage selection unit 13 measures the driving force and an acceleration of the vehicle V, and obtains the travel resistance of the vehicle V from the relationship between the driving force and the acceleration of the vehicle V. The current gear stage selection unit 13 selects as the current gear stage a highest gear stage among the gear stages at which the driving force of the vehicle V becomes greater than the travel resistance in the current travel section A of the vehicle V by equal to or greater than a predetermined value D1. The predetermined value D1 is set, for example, as a lower limit value of a marginal driving force obtained by subtracting the travel resistance from a maximum driving force of the vehicle V.

A specific value of the predetermined value D1 may be determined via an experiment in consideration of performance of the engine 1, a weight assumed as a load to be carried by the vehicle V, a gradient of a road on which the vehicle V is assumed to travel, and the like. As an example, a predetermined value D1 is set for each gear stage, and the value thereof is set to be greater for a higher gear stage. By selecting the gear stage such that at least the predetermined value D1 is secured as the marginal driving force, the current gear stage selection unit 13 can maintain the speed of the vehicle V or recover from deceleration even if the travel resistance of the vehicle V increases due to some reason such as a sudden change in the road gradient.

[Method for Selecting Current Gear Stage]

Figure 4:
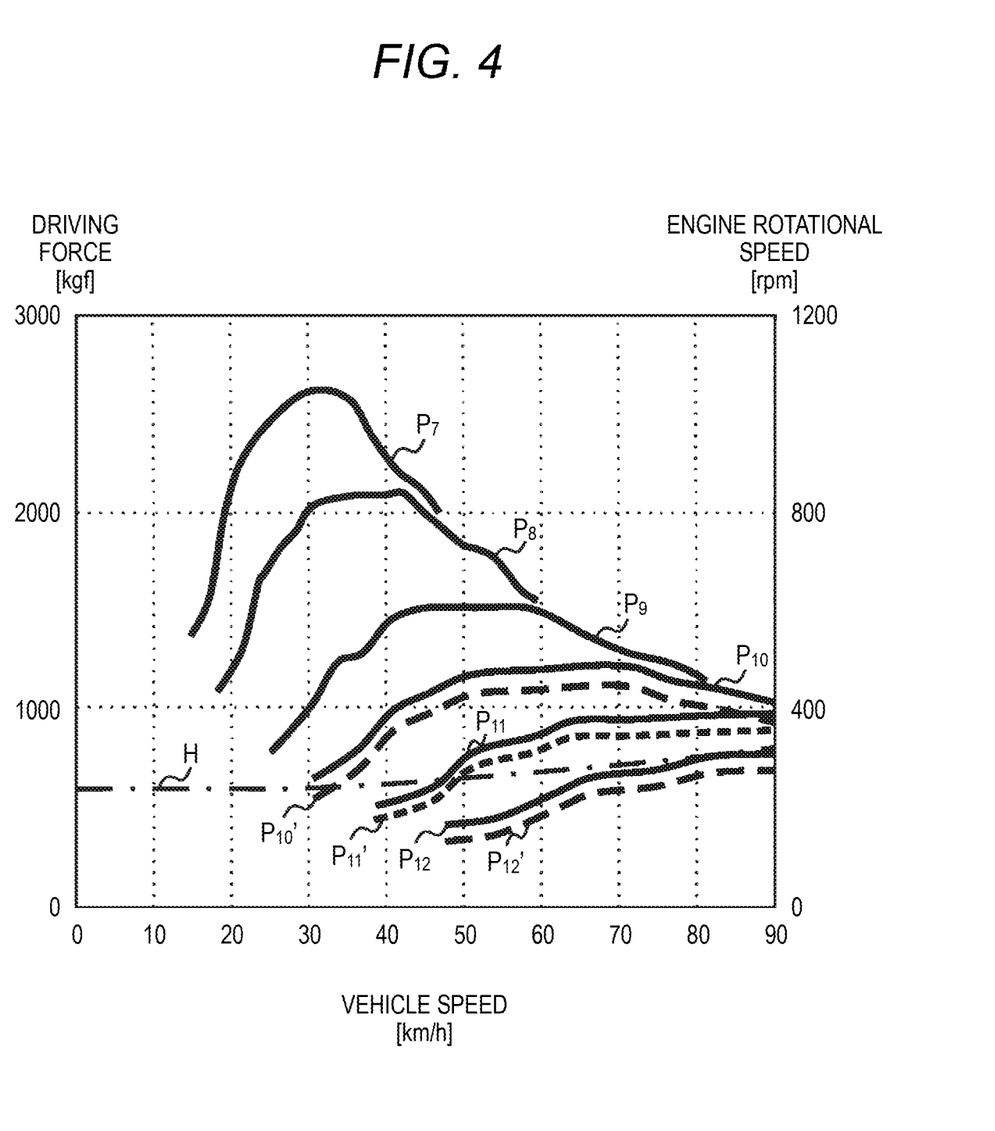
FIG. 4 is a travel performance diagram of a vehicle.

A method for selecting the current gear stage with the current gear stage selection unit 13 will be described with reference to FIG. 4. FIG. 4 is a travel performance diagram of the vehicle V. A vertical axis in FIG. 4 indicates the driving force of the vehicle by kgf, and a horizontal axis indicates the speed of the vehicle V by km/h. Solid lines P7 to P12 indicate the maximum driving forces of the vehicle V at seventh to twelfth stages, respectively. Broken lines P10' to P12' are corrected driving forces of the current gear stage at the tenth to the twelfth stages, respectively. The corrected driving force of the current gear stage is a value obtained by multiplying the maximum driving force by a predetermined coefficient smaller than 1.

A curve H indicates the travel resistance in the current travel section A of the vehicle V in travel. In principle, the fuel consumption of the vehicle V decreases as the gear stage is higher. On the other hand, if a gear stage having a maximum driving force smaller than the travel resistance in the current travel section A is selected in the current gear stage selection unit 13, the vehicle V is stalled. If a gear stage having a corrected driving force of the current gear stage lower than the travel resistance in the current travel section A is selected in the current gear stage selection unit 13, the vehicle V is stalled unless an actual driving force is higher than the travel resistance.

Then, the current gear stage selection unit 13 selects as the current gear stage a highest gear stage among the gear stages at which the corrected driving force of the current gear stage is greater than the travel resistance in the current travel section A. At this time, the current gear stage selection unit 13 selects the gear stage so that the maximum driving force of the vehicle V is at least greater than the travel resistance in the current travel section A by equal to or greater than the predetermined value D1, assuming that a difference between the maximum driving force and the corrected driving force of the current gear stage is the driving force of the predetermined value D1.

In the example of FIG. 4, assuming that the speed of the vehicle V is 80 km/h, the corrected driving force of the current gear stage of the twelfth stage indicated by the broken line P12' is smaller than the travel resistance in the current travel section A indicated by the curve H. On the other hand, the gear stage of the eleventh stage indicated by the broken line P11' is the highest gear stage among the gear stages in which the corrected driving force of the current gear stage is greater than the travel resistance in the current travel section A. Therefore, the current gear stage selection unit 13 selects the gear stage of the eleventh stage.

Based on the information indicating the position of the vehicle V acquired from the GPS sensor 3 and map information stored in the storage unit 11, the road gradient acquisition unit 14 acquires the road gradient on the road on which the vehicle V is currently traveling. The road gradient acquisition unit 14 acquires the road gradient in a predetermined gradient acquisition range, and acquires, for example, the road gradient from a travel position of the vehicle V acquired from the GPS sensor 3 to a position 500 in ahead of the vehicle V in the travel direction. The road gradient acquisition unit 14 acquires the road gradient, for example, per measurement unit of 25 m, and reads the road gradient at the position of 500 m ahead of the travel position of the vehicle from the storage unit 11 each time the vehicle V advances 25 m.

The travel section determination unit 15 determines the current travel section A and the forward travel section B based on the road gradient acquired by the road gradient acquisition unit 14. First, the travel section determination unit 15 determines a temporary travel section in the gradient acquisition range. For example, the travel section determination unit 15 determines a minimum section from the travel position of the vehicle V to 100 m ahead of the vehicle V in the travel direction as the temporary travel section.

[Method for Evaluating Travel Section]

Figure 5:
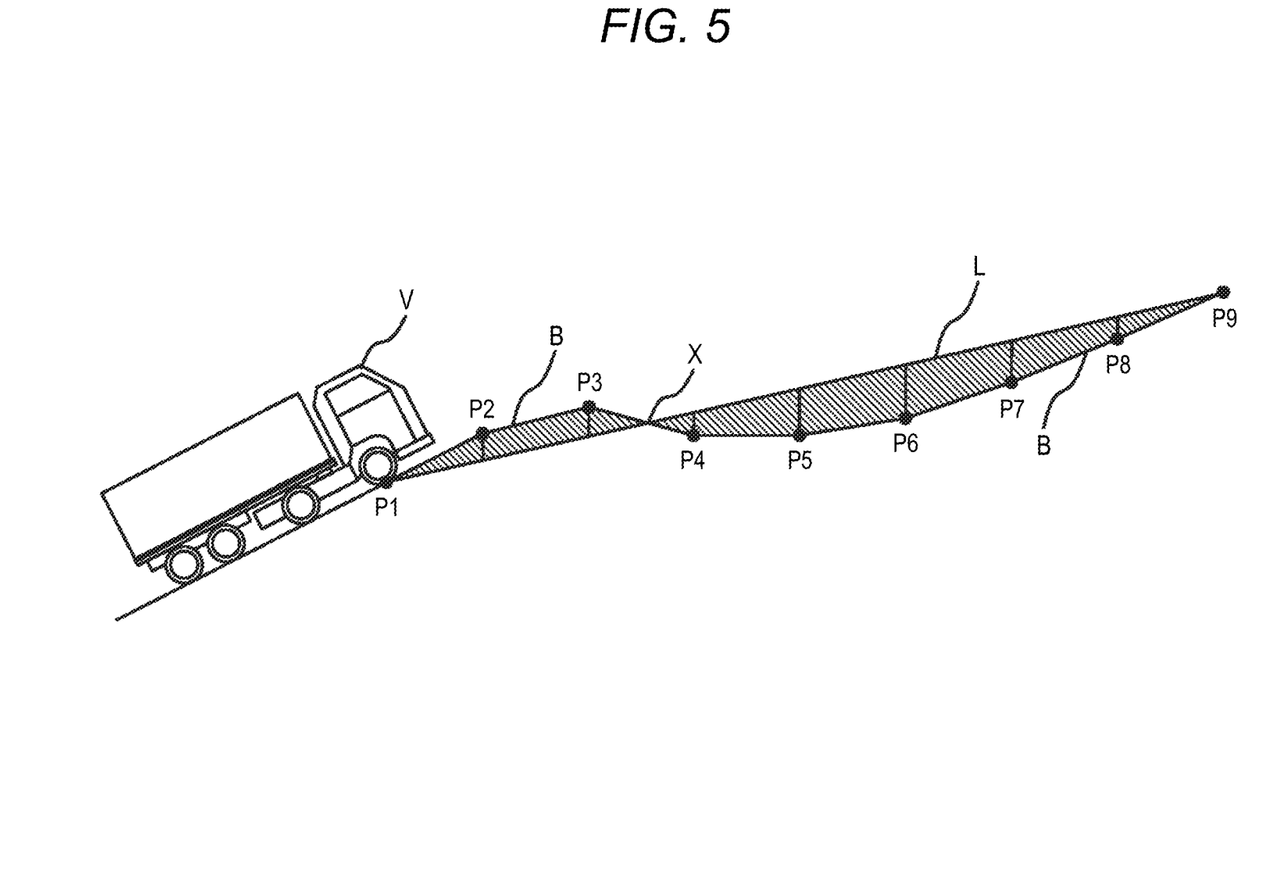
FIG. 5 is a diagram for explaining a method for evaluating a travel section with a travel section determination unit.

Next, a method for evaluating the travel section with the travel section determination unit 15 will be described with reference to FIG. 5. FIG. 5 shows a state in which the temporary travel section is divided. In a case where the temporary travel section is within a range from a travel position P1 to a position P9 of the vehicle V, the travel section determination unit 15 equally divides the temporary travel section into a plurality of sections. Here, the travel section determination unit 15 equally divides the temporary travel section into eight at the positions P2, P3, ..., P8. Still further, the travel section determination unit 15 determines a total area formed between a broken line B that sequentially follows line segments respectively connecting the positions P1 and P2, the positions P2 and P3, the positions P3 and P4, the positions P4 and P5, the positions P5 and P6, the positions P6 and P7, the positions P7 and P8, and the positions P8 and P9, which are end points of the equally divided sections, and a line segment L connecting P1 and P9.

The broken line B and the line segment L intersect at a position X between the positions P3 and P4. The total area formed between the broken line B and the line segment L is obtained as the sum of areas of a tetragon formed by four positions including the positions P1, P2, P3, and X, and an area of a heptagon formed by seven positions including the positions X, P4, P5, P6, P7, P8, and P9. At this time, the tetragon is formed above the line segment L, and the heptagon is formed below the line segment L. Therefore, the travel section determination unit 15 may obtain the sum with the area formed above the line segment L as a positive area and with the area formed below the line segment L as a negative area.

The travel section determination unit 15 compares an absolute value of the total area formed between the broken line B and the line segment L with an equal-gradient determination threshold value, and determines that the section from the position P1 to the position P8 excluding the end position P9 is one travel section if the absolute value of the total area is greater than the equal-gradient determination threshold value. The equal-gradient determination threshold value is a value for determining whether or not the gradients of each position in the travel section can be considered as equal.

On the other hand, if the absolute value of the total area is smaller than the equal-gradient determination threshold value, the travel section determination unit 15 further extends the temporary travel section. For example, the travel section determination unit 15 adds a new position P10 such that the temporary travel section is extended by a measurement unit, and similarly obtains a total area formed between a broken line that sequentially follows line segments between positions Pk to Pk+1 (k=1, 2, ..., 9), which are endpoints of sections obtained by equally dividing a range from the positions P1 to P10 as the temporary travel sections, and a line segment P1 to P10, which are end points of the temporary travel section.

The travel section determination unit 15 determines one travel section by extending the temporary travel section until the absolute value of the total area becomes greater than the equal-gradient determination threshold value. The travel section determination unit 15 determines the current travel section A and the forward travel section B by sequentially determining a plurality of travel sections adjacent to each other.

The forward gear stage selection unit 16 selects the forward gear stage, which is a gear stage of the transmission 2 in the forward travel section B, based on the road gradient of the forward travel section B and the speed of the vehicle V. The current gear stage selection unit 13 obtains the travel resistance in the current travel section A from the relationship between the driving force of the vehicle V and the acceleration of the vehicle V, whereas the forward gear stage selection unit 16 obtains the travel resistance on the vehicle V in the forward travel section B by using the road gradient acquired by the road gradient acquisition unit 14. The forward gear stage selection unit 16 selects as the forward gear stage a highest gear stage among the gear stages at which the maximum driving force of the vehicle V becomes greater than the travel resistance in the forward travel section B of the vehicle V by equal to or greater than a predetermined value D2.

Since the forward gear stage selection unit 16 acquires road gradient data corresponding to the position of the vehicle V acquired by the GPS sensor 3, a forward-section travel resistance can be grasped with higher accuracy than a current-section travel resistance. Therefore, relative to calculation of the current gear stage, the forward gear stage can be selected under a condition that the predetermined value D2, which is the driving force of the difference between the maximum driving force and the corrected driving force of the forward gear stage, is set to 0 or smaller than the predetermined value D1 at the time of selecting the current gear stage. Since the predetermined value D2 can be set smaller than the predetermined value D1, a frequency at which the forward gear stage selection unit 16 selects a higher gear stage is raised.

Figure 6:
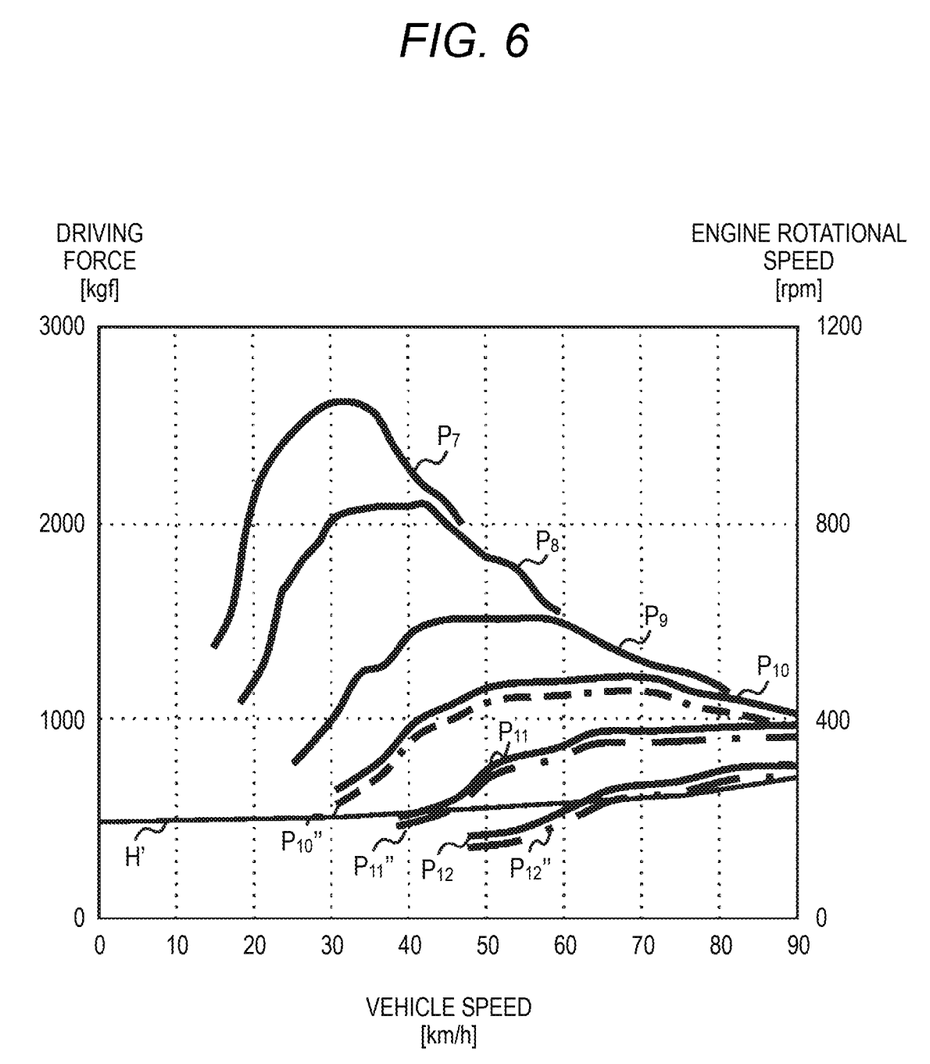
FIG. 6 is a travel performance diagram of a vehicle.

A method for selecting the forward gear stage with the forward gear stage selection unit 16 will be described with reference to FIG. 6. FIG. 6 is a travel performance diagram of the vehicle V. Similarly to FIG. 4, a vertical axis in FIG. 6 indicates the driving force of the vehicle by kgf, and a horizontal axis indicates the speed of the vehicle V by km/h. Solid lines P7 to P12 indicate the maximum driving forces of the vehicle V at the seventh to the twelfth stages, respectively, which is similar as in FIG. 4. One-dot chain lines P10" to P12" are corrected driving forces of the forward gear stage at the tenth to the twelfth stages, respectively. Since the predetermined value D2, which is the driving force of the difference between the maximum driving force and the corrected driving force of the forward gear stage, is smaller than the predetermined value D1, the dashed lines P10" to P12" are greater values than the broken lines P10' to P12' indicating the corrected driving forces at the tenth to the twelfth stages in FIG. 4, respectively.

The corrected driving force of the forward gear stage is a value obtained by multiplying the maximum driving force by a predetermined coefficient smaller than 1. A curve H' indicating the travel resistance of the forward travel section B is shown in FIG. 6. The travel resistance of the curve H' differs from the travel resistance of the curve H in the gradient of the travel section. The forward gear stage selection unit 16 selects the highest gear stage among the gear stages having a corrected driving force of the forward gear stage exceeding the travel resistance of the forward travel section B.

In the example of FIG. 6, when the speed of the vehicle V is 80 km/h, the highest gear stage among the ninth to the twelfth gear stages having a corrected driving force of the forward gear stage exceeding the travel resistance of the forward travel section B indicated on the curve H' is the gear stage of the twelfth stage. Therefore, the forward gear stage selection unit 13 selects the gear stage of the twelfth stage as the forward gear stage.

The shift control unit 17 shifts the vehicle V by controlling the transmission 2. The shift control unit 17 shifts to the current gear stage selected by the current gear stage selection unit 13 in the current travel section A. For example, in a case where neither the vehicle V is in the automatic travel mode nor the speed of the vehicle V reaches the upper limit speed set in the vehicle, the shift control unit 17 shifts to the gear stage selected by the current gear stage selection unit 13 without shifting to the forward gear stage selected by the forward gear stage selection unit 16.

In a case where the forward gear stage is a gear stage higher than the current gear stage, the shift control unit 17 performs upshift to the forward gear stage while traveling in the current travel section A under a predetermined condition. More specifically, since there is no need to accelerate in a case where the vehicle V is in the automatic travel mode, the shift control unit 17 performs upshift to the forward gear stage in the current travel section A in a case where: (1) the vehicle V is in the automatic travel mode, and (2) the vehicle V does not stall in the current travel section A when the vehicle V travels at the forward gear stage.

In a case where the maximum driving force at the current speed of the vehicle V is equal to or greater than the travel resistance of the vehicle V in the current travel section A when the vehicle V is upshifted to the forward gear stage, the vehicle V does not stall. Therefore, the forward gear stage selection unit 16 selects the forward gear stage such that the marginal driving force of the forward travel section is equal to or greater than the predetermined value D2.

Even in a case where the vehicle V stalls in the current travel section A when the vehicle is upshifted to the forward gear stage, the shift control unit 17 performs upshift to the forward gear stage in the current travel section A in a case where: (1) the vehicle V is in the automatic travel mode, (2) a stall amount until the vehicle V passes an end point of the current travel section A in a case where the vehicle V travels in the current travel section A at the forward gear stage is equal to or smaller than a specified value, and (3) a marginal driving force in a case where the vehicle V travels in the forward travel section B at the forward gear stage is equal to or greater than a predetermined value D3. The predetermined value D3 is the driving force of the difference between the maximum driving force and the corrected driving force of the forward gear stage, and is greater than the predetermined value D2. The predetermined value D3 is a driving force for securing the acceleration that recovers the stall amount in the forward travel section. The specified value of the stall amount is, for example, a value that allows the vehicle V to recover the stall amount in the forward travel section in a case where the marginal driving force of the forward travel section when the forward gear stage is selected is equal to or greater than the predetermined value D3.

In a case where the maximum driving force of the vehicle V is smaller than the travel resistance of the vehicle V in the current travel section A when the vehicle V is upshifted to the forward gear stage, the vehicle V stalls in the current travel section A when the vehicle V is upshifted to the forward gear stage. However, since the vehicle V can obtain sufficient acceleration in the forward travel section B, the stall amount can be recovered in the forward travel section B. Therefore, the shift control unit 17 allows the stall amount within the specified value in the current travel section A.

On the other hand, in a case where the stall amount until the vehicle V passes the end point of the current travel section A in a case where the vehicle V travels in the current travel section A at the forward gear stage exceeds the specified value, the shift control unit 17 does not perform upshift even in a case where the vehicle V is in the automatic travel mode.

The shift control unit 17 refers to the travel performance diagram, and obtains the stall amount until the vehicle passes the end point of the current travel section A when the vehicle is upshifted to the forward gear stage. The difference between the travel resistance in the current travel section A on the curve H and the maximum driving force at the forward gear stage of the vehicle V corresponds to a shortage amount of the driving force of the vehicle V. Therefore, the shift control unit 17 can obtain the stall amount of the vehicle V from the shortage amount and a distance of a remaining section of the current travel section A.

Next, in a case where the vehicle V stalls in the current travel section during travel at the forward gear stage, the shift control unit 17 refers to the travel performance diagram of FIG. 6, and determines a minimum speed at which the travel resistance of the forward travel section B of the vehicle V and the maximum driving force of the forward gear stage coincide with each other. For example, in a case where the forward gear stage is the twelfth stage, the shift control unit 17 obtains a speed at an intersection of the solid line P12 indicating the maximum driving force of the twelfth stage and the curve H' indicating the travel resistance of the forward travel section B as the minimum speed at which the vehicle V can travel.

Further, the shift control unit 17 obtains a delay speed from the minimum speed. The delay speed is a driving force for securing the acceleration that recovers the stall amount in the forward travel section, and is obtained by multiplying the minimum speed with a predetermined coefficient greater than 1. The delay speed is, for example, a speed that is 5% higher than the minimum speed. In a case where the vehicle V travels at a speed equal to or greater than the delay speed after the vehicle V is upshifted to the forward gear stage, the marginal driving force in the forward travel section B is equal to or greater than the predetermined value D3. Based on the stall amount of the vehicle V, the shift control unit 17 obtains the speed of the vehicle V at the start point of the forward travel section B in a case where the vehicle V travels at the forward gear stage, and compares the calculated speed of the vehicle V with the delay speed.

In a case where the vehicle V at the start point of the forward travel section B is at a speed equal to or greater than the delay speed, the shift control unit 17 performs upshift of the forward gear stage in the current travel section A. In a case where the vehicle V at the start point of the forward travel section B is lower than the delay speed, the shift control unit 17 cannot recover the stall amount in the forward travel section B after upshift, and therefore does not perform upshift to the forward gear stage.

In a case where the engine rotational speed is lower than a range of the engine rotational speed suitable for outputting the driving force of the vehicle V due to upshift to the forward gear stage in the current travel section A, sufficient acceleration cannot be obtained even in the forward travel section B. Therefore, the vehicle V may not be capable of recovering the stall amount rapidly. Therefore, the shift control unit 17 obtains an estimated value of the engine rotational speed of the vehicle V at the end point of the current travel section A in a case where the vehicle V travels at the forward gear stage, and compares the estimated value with a predetermined rotational speed.

The predetermined rotational speed is a lower limit value of a range in which a graph with the engine rotational speed as a horizontal axis and the driving force as a vertical axis is substantially flat (a so-called "torque band"). The shift control unit 17 does not perform upshift to the forward gear stage in a case where the estimated value of the engine rotational speed of the vehicle at the end point of the current travel section A in a case where the vehicle V travels in the current travel section A at the forward gear stage is lower than the predetermined rotational speed.

In a case where the deceleration is increased in the current travel section A when the vehicle is upshifted to the forward gear stage, ride comfort of the driver may be impaired. Thus, the shift control unit 17 compares the deceleration in a case where the vehicle travels in the current travel section A at the forward gear stage with a threshold value. This threshold value is, for example, a value smaller than the acceleration obtained by the vehicle V in the forward travel section B when the vehicle is upshifted to the forward gear stage. The shift control unit 17 does not perform upshift to the forward gear stage in a case where a deceleration in a case where the vehicle travels in the current travel section A at the forward gear stage is greater than the threshold value.

In a case where the forward travel section B is a descending gradient having a steep gradient, it is necessary to apply a stronger engine brake, and thus it is desirable to maintain the current gear stage which is lower than the forward gear stage. Thus, the shift control unit 17 compares the descending gradient of the forward travel section B with an inclination determination reference value. The inclination determination reference value is a threshold value for detecting, in the shift control unit 17, an inclination necessary for the vehicle V to apply the engine brake. The shift control unit 17 does not perform upshift to the forward gear stage in a case where the gradient of the forward travel section is a descending gradient exceeding the inclination determination reference value.

In a case where the upper limit speed set in the vehicle V has been reached in the operational travel mode and the speed limit device is operating, the speed limit device controls the engine 1 and the transmission 2 so that the speed of the vehicle V does not exceed the set upper limit speed. The vehicle V cannot accelerate when the speed limit device is operating.

Even in a case where the vehicle V stalls in the current travel section A when the vehicle is upshifted to the forward gear stage, the shift control unit 17 performs upshifts to the forward gear stage in the current travel section A in a case where: (1) the speed of the vehicle V has reached the upper limit speed, (2) the stall amount until the vehicle V passes the end point of the current travel section A in the case where the vehicle V travels in the current travel section A at the forward gear stage is equal to or smaller than a specified value, and (3) the marginal driving force in the case where the vehicle V travels in the forward travel section B at the forward gear stage is equal to or greater than the predetermined value D3. The specified value is, for example, a value that allows the vehicle V to recover the stall amount in the forward travel section in the case where the marginal driving force of the forward travel section when the forward gear stage is selected is equal to or greater than the predetermined value D3.

[Flowchart Illustrating an Example of Operation of Vehicle Control Device 10]

Figure 7:
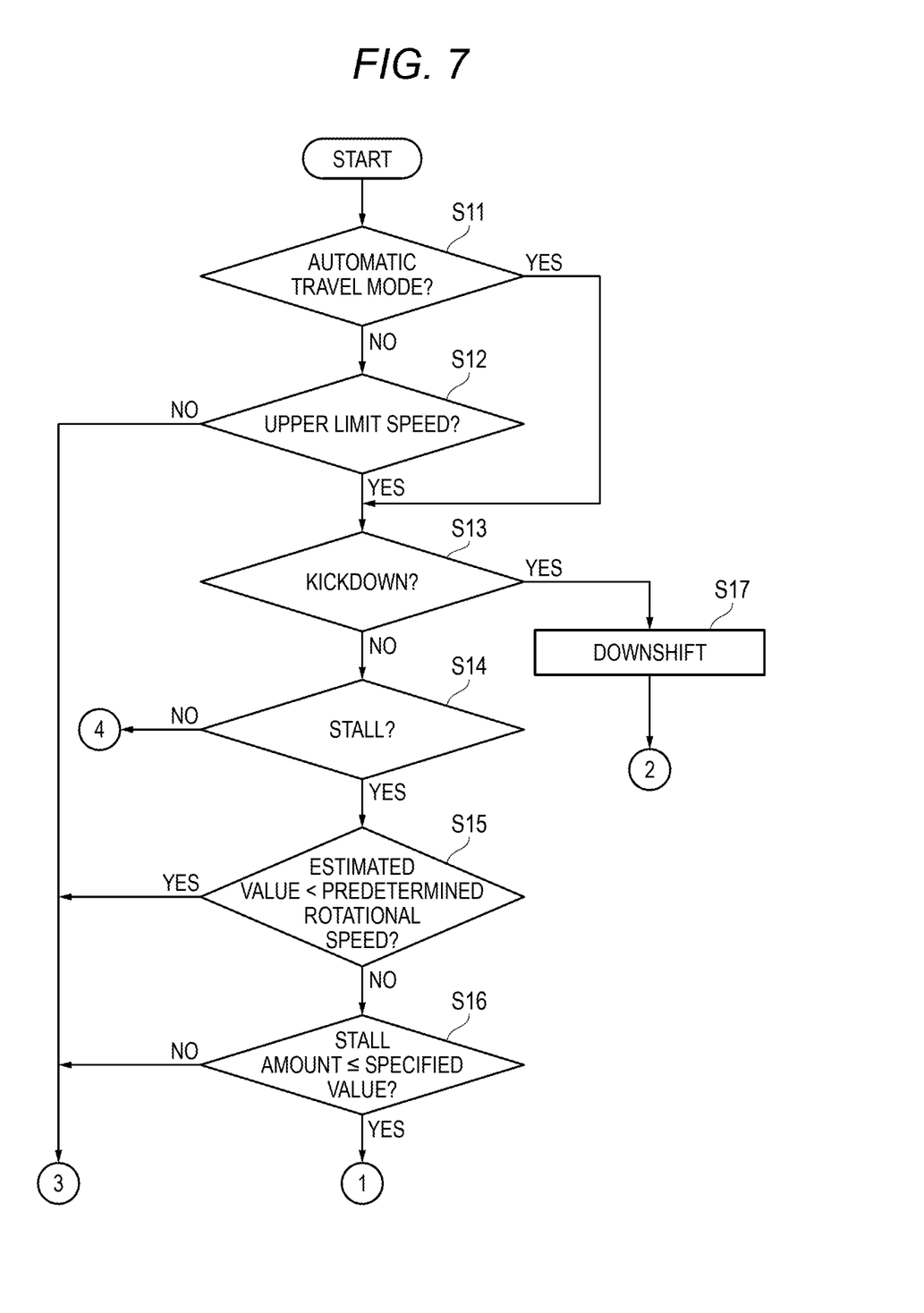
FIG. 7 is a flowchart illustrating an example of operation of a vehicle control device.
Figure 8:
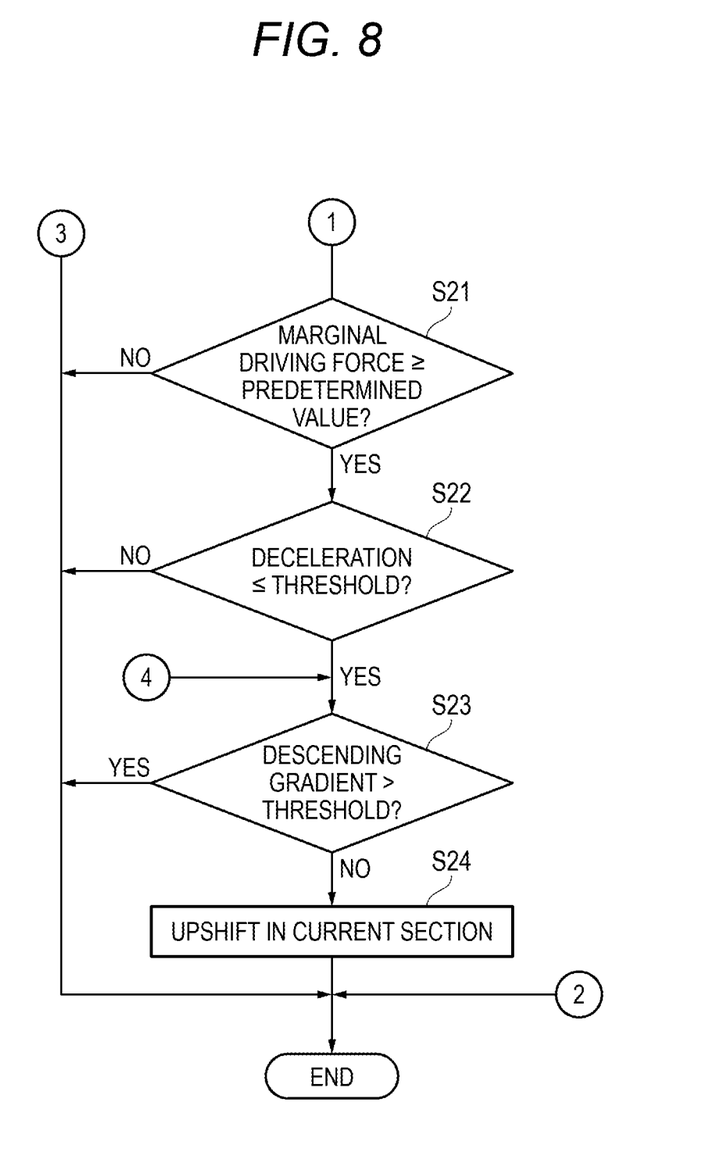
FIG. 8 is a flowchart illustrating an example of operation of the vehicle control device.

FIGS. 7 and 8 are flowcharts illustrating an example of operation of the vehicle control device 10. This processing procedure is started in a steady state when a variation width of the speed of the vehicle V measured by the speed sensor 5 is smaller than a steady travel determination threshold value. The steady travel determination threshold value is a value for detecting that the vehicle V is traveling on a road with little right or left turns and stops. Examples of a road with little right or left turns and stops include a highway.

First, the shift control unit 17 determines whether or not the vehicle V is in the automatic travel mode (S11). In a case where the vehicle V is in the operational travel mode (NO in S11), the shift control unit 17 determines whether or not the speed of the vehicle V has reached the upper limit speed set in the vehicle (S12). In a case where the speed of the vehicle V has reached the upper limit speed set in the vehicle (YES in S12), the shift control unit 17 determines whether or not an accelerator opening degree assigned to a kickdown operation has been measured by the accelerator opening degree sensor 6 (S13).

In a case where the accelerator opening degree measured by the accelerator opening degree sensor 6 is determined as not the accelerator opening degree assigned to the kickdown operation (NO in S13), the shift control unit 17 determines whether or not the vehicle V stalls in a case where the vehicle V travels at the forward gear stage (S14). In a case where the vehicle V stalls in the case where the vehicle V travels at the forward gear stage (YES in S14), the shift control unit 17 obtains the estimated value of the engine rotational speed of the vehicle V at the end point of the current travel section A in a case where the vehicle V travels at the forward gear stage, and compares the estimated value with the predetermined rotational speed (S15). The predetermined rotational speed is a minimum value in a range of the engine rotational speed in which decrease in the driving force is relatively small with respect to change in the rotational speed.

In a case where the estimated value of the engine rotational speed of the vehicle V at the end point of the current travel section A in the case where the vehicle V travels at the forward gear stage is equal to or greater than the predetermined rotational speed (NO in S15), the shift control unit 17 determines whether or not the stall amount until the vehicle V passes the end point of the current travel section A in the case where the vehicle V travels in the current travel section A at the forward gear stage is equal to or smaller than the specified value (S16). In a case where the stall amount until the vehicle V passes the end point of the current travel section A in the case where the vehicle V travels in the current travel section A at the forward gear stage is equal to or smaller than the specified value (YES in S16), the shift control unit 17 compares the marginal driving force of the forward travel section B in the case where the vehicle V travels at the forward gear stage with the predetermined value D3 (S21).

In a case where the marginal driving force of the forward travel section B in the case where the vehicle V travels at the forward gear stage is equal to or greater than the predetermined value D3 (YES in S21), the shift control unit 17 compares the deceleration in a case where the vehicle travels in the current travel section A at the forward gear stage with the threshold value (S22). In a case where the deceleration in the case where the vehicle travels in the current travel section A at the forward gear stage is equal to or smaller than the threshold value (YES in S22), the shift control unit 17 determines whether or not the forward travel section B is a descending gradient having a gradient exceeding the inclination determination reference value (S23).

The inclination determination reference value is a threshold value for detecting, in the shift control unit 17, an inclination necessary for the vehicle V to apply the engine brake. In a case where the forward travel section B is not a descending gradient having a gradient exceeding the inclination determination reference value (NO in S23), the shift control unit 17 performs upshift to the forward gear stage in the current travel section A (S24), and the processing is ended. In a case where the vehicle V is in the automatic travel mode in the determination in step S11 (YES in step S11), the shift control unit 17 proceeds to the processing of step S13.

In a case where the speed of the vehicle V has not reached the upper limit speed set in the vehicle (NO in step S12), the shift control unit 17 does not perform upshift to the forward gear stage in the current travel section A, and the processing is ended. In a case where the accelerator opening degree measured by the accelerator opening degree sensor 6 is determined as the accelerator opening degree assigned to the kickdown operation in step S13 (YES in S13), the shift control unit 17 performs downshift from the current gear stage (S17), and the processing is ended.

In a case where the vehicle V does not stall in a case where the vehicle V travels at the forward gear stage in the determination in step S14 (No in step S14), the shift control unit 17 proceeds to the processing of step S23. In a case where the estimated value of the engine rotational speed of the vehicle V at the end point of the current travel section A in a case where the vehicle V travels at the forward gear stage is lower than the predetermined rotational speed in the determination of step S15 (YES in S15), the shift control unit 17 does not perform upshift, and the processing is ended. In a case where the stall amount until the vehicle V passes the end point of the current travel section A in the case where the vehicle V travels in the current travel section A at the forward gear stage is greater than the specified value in the determination of step S15 (NO in S16), the shift control unit 17 does not perform upshift, and the processing is ended. In a case where the marginal driving force of the forward travel section B in the case where the vehicle V travels at the forward gear stage is smaller than the predetermined value D3 in the determination of step S21 (NO in S21), the shift control unit 17 does not perform upshift, and the processing is ended.

In a case where the deceleration in the case where the vehicle travels in the current travel section A at the forward gear stage is greater than the threshold value in the determination of step S22 (NO in step S22), the shift control unit 17 does not perform upshift, and the processing is ended. In a state where the forward travel section B is a descending gradient having a gradient exceeding the inclination determination reference value in the determination of step S23 (YES in S23), the shift control unit 17 does not perform upshift in the current travel section A, and the processing is ended.

In a case where the travel resistance of the vehicle V in the current travel section A is greater than the driving force in the case where the vehicle V travels at the forward gear stage, the vehicle V stalls when the upshift to the forward gear stage is performed. According to the present embodiment, even in the case where the vehicle V stalls when the upshift to the forward gear stage is performed, upshift to the forward gear stage in the current travel section A is performed in a case where: (1) the stall amount until the vehicle V passes the end point of the current travel section A in the case where the vehicle V travels in the current travel section A at the forward gear stage is equal to or smaller than the specified value, and (2) the marginal driving force obtained by subtracting the travel resistance of the vehicle V in the forward travel section B from the driving force in the case where the vehicle V travels in the forward travel section B at the forward gear stage is equal to or greater than the predetermined value D3.

Therefore, since the timing of the upshift can be advanced, the fuel consumption of the vehicle V can be reduced. Further, in the forward travel section B, since the marginal driving force in the case where the vehicle travels at the forward gear stage is equal to or greater than the predetermined value D3, the stall amount in the current travel section A can be recovered in the forward travel section B.

According to the present embodiment, the shift control unit 17 does not perform upshift in the current travel section A in the case where the estimated value of the engine rotational speed of the vehicle at the end point of the current travel section A in the case where the vehicle V travels in the current travel section A at the forward gear stage is lower than the predetermined rotational speed. Therefore, it is possible to prevent the problem that a sufficient acceleration of the vehicle V cannot be obtained in the forward travel section B due to decrease in the engine rotational speed in the current travel section A.

According to the present embodiment, the shift control unit 17 does not perform upshift up in the case where the gradient of the forward travel section is a descending gradient exceeding the inclination determination reference value. Therefore, it is possible to prevent the engine brake from becoming less effective in the forward travel section due to upshift to the forward gear stage in the current travel section.

The above has explained an example in which the shift control unit 17 performs upshift to the forward gear stage in the current travel section A under a condition that: (1) the forward gear stage is higher than the current gear stage A that is the gear stage of the vehicle V in the current travel section, (2) the travel resistance of the vehicle V in the current travel section A is greater than the driving force in the case where the vehicle V travels at the forward gear stage, (3) the stall amount until the vehicle V passes the end point of the current travel section A in the case where the vehicle V travels in the current travel section A at the forward gear stage is equal to or smaller than the specified value, (4) the value obtained by subtracting the travel resistance of the vehicle V in the forward travel section B from the driving force in the case where the vehicle V travels in the forward travel section B at the forward gear stage is equal to or greater than the predetermined value D3, and (5) the vehicle V is in the automatic travel mode or the speed of the vehicle V is the upper limit value set in the vehicle V.

However, in the present disclosure, the condition of upshift to the forward gear stage in the current travel section A is not limited to that the vehicle V is in the automatic travel mode or the speed of the vehicle V is the upper limit value set in the vehicle V. For example, in a case where (1) to (4) are all satisfied, the vehicle V may perform upshift to the forward gear stage in the current travel section A under a condition that the vehicle V is in the steady state.

In a case where the accelerator opening degree measured by the accelerator opening degree sensor 6 in the automatic travel mode is equal to or greater than an acceleration determination threshold value, the driver is likely to obtain the acceleration prior to reducing the fuel consumption. Therefore, in the case where the accelerator opening degree in the automatic travel mode is equal to or greater than the acceleration determination threshold value, the shift control unit 17 may maintain the current gear stage without performing upshift in the current travel section A. The acceleration determination threshold value is a threshold value referred to by the shift control unit 17 for determining whether or not the driver intends to travel at a speed higher than the speed of the vehicle V set in the automatic travel mode. By employing such a configuration, in a case where the driver intends to accelerate the vehicle V in the automatic travel mode, it is possible to prevent a problem that a sufficient acceleration cannot be obtained due to upshift to the forward gear stage.

The current gear stage selection unit 13 selects a gear stage so that the driving force of the vehicle V is greater than the travel resistance in the current travel section A of the vehicle V by equal to or greater than the predetermined value D1, and the forward gear stage selection unit 16 selects a gear stage so that the driving force of the vehicle V is greater than the travel resistance of the forward travel section B of the vehicle V by equal to or greater than the predetermined value D2. The present embodiment has explained an example in which the predetermined value D2 is smaller than the predetermined value D1 or the predetermined value D2 is 0, but the present disclosure is not limited thereto. For example, the predetermined value D1 and the predetermined value D2 may be the same value.

The present embodiment has explained an example in which the current gear stage selection unit obtains the travel resistance in the current travel section A from the relationship between the driving force of the vehicle V and the acceleration of the vehicle V and determines the travel resistance based on the travel resistance and the speed of the vehicle V, but the present disclosure is not limited thereto. For example, the current gear stage selection unit may determine the travel resistance by using the road gradient read from the storage unit 11 by the road gradient acquisition unit 14. For example, by using the road gradient read from the storage unit 11 by the road gradient acquisition unit 14, the current gear stage selection unit can acquire an accurate road gradient compared to the case where the travel resistance in the current travel section A is obtained from the relationship between the driving force of the vehicle V and the acceleration of the vehicle V.

The present embodiment has explained an example in which the current gear stage selection unit 13 and the forward gear stage selection unit 16 respectively select the current gear stage and the forward gear stage by using the travel performance diagram of FIG. 4. However, the present disclosure is not limited thereto. For example, the current gear stage selection unit 13 and the forward gear stage selection unit 16 may be configured to respectively select the current gear stage and the forward gear stage by using an iso-horsepower diagram.

Although the present disclosure has been described using embodiments, the technical scope of the present disclosure is not limited to the scope described in the above embodiment, and various modifications and changes can be made without departing from the scope thereof. For example, a specific embodiment of distributing and integrating devices is not limited to the above embodiment, and all or a part thereof may be configured to be functionally or physically distributed and integrated in arbitrary units. New embodiments generated from any combination of a plurality of embodiments are also included in embodiments of the present disclosure. Effects of the new embodiments generated from the combinations include effects of the original embodiments.

This application is based on the Japanese Patent Application (2017-095968), filed May 12, 2017, the contents of which are incorporated herein by reference.

INDUSTRIAL APPLICABILITY

The vehicle control device of the present disclosure is useful in being capable of preventing increase in fuel consumption in a case where a gradient varies on a road on which a vehicle is currently traveling.

REFERENCE SIGNS LIST

1 Engine
2 Transmission
3 GPS sensor
4 Weight sensor
5 Speed sensor
6 Accelerator opening degree sensor
10 Vehicle control device
11 Storage unit
12 Control unit
13 Current gear stage selection unit
14 Road gradient acquisition unit
15 Travel section determination unit
16 Forward gear stage selection unit
Shift control unit
A Current travel section
B Forward travel section
V Vehicle

The invention claimed is:

1. A vehicle control device comprising:
a travel section determination unit configured to determine a forward travel section that is a travel section having a different road gradient from a current travel section in which a vehicle is currently traveling and that is ahead in a travel direction of the vehicle;
a forward gear stage selection unit configured to select a forward gear stage, which is a gear stage of the vehicle in the forward travel section, based on the road gradient of the forward travel section; and
a shift control unit configured to perform upshift to the forward gear stage in the current travel section in a case where: (1) the forward gear stage is higher than a current gear stage which is a gear stage of the vehicle in the current travel section; (2) a travel resistance of the vehicle in the current travel section is greater than a driving force in a case where the vehicle travels at the forward gear stage; (3) a stall amount until the vehicle passes an end point of the current travel section in a case where the vehicle travels in the current travel section at the forward gear stage is equal to or smaller than a specified value; and (4) a value obtained by subtracting a travel resistance of the vehicle in the forward travel section from a driving force in a case where the vehicle travels in the forward travel section at the forward gear stage is equal to or greater than a predetermined value.

2. The vehicle control device according to claim 1, wherein the shift control unit does not perform the upshift to the forward gear stage in a case where an estimated value of an engine rotational speed of the vehicle at the end point of the current travel section in the case where the vehicle travels in the current travel section at the forward gear stage is lower than a predetermined rotational speed.

3. The vehicle control device according to claim 1, wherein the shift control unit does not perform the upshift to the forward gear stage in a case where a deceleration in a case where the vehicle travels in the current travel section at the forward gear stage is greater than a threshold value.

4. The vehicle control device according to claim 1, wherein the shift control unit does not perform the upshift to the forward gear stage in a case where the gradient of the forward travel section is a descending gradient exceeding a reference value.

* * * * *